Feb. 21, 1939.     H. P. MIXER     2,148,170
CLUTCH MECHANISM
Filed Jan. 8, 1937

INVENTOR
H.P. MIXER
BY *H. A. Sparks*
HIS ATTORNEY

Patented Feb. 21, 1939

2,148,170

UNITED STATES PATENT OFFICE 2,148,170

CLUTCH MECHANISM

Harold P. Mixer, Frankfort, N. Y., assignor to Remington Rand Inc., Buffalo, N. Y., a corporation of Delaware Application January 8, 1937, Serial No. 119,560

3 Claims. (Cl. 192—46)

This invention relates to clutch mechanism, and more particularly to a device for locking the clutch members of a positive clutch against overriding.

The invention is pertinent to clutches of the positive type, the members of which may be, as is well known, uni-directional, that is, the teeth are only effective when the drive member is rotating in one direction. Any rotation in a reverse direction will cause the driving and driven members to be cammed apart and the teeth of one to override the other. Very often, when clutches of this type are used at high speeds, the engagement of the teeth of the driving member with those of the driven member, which is stationary, causes an impact between the teeth similar to that of a golf club meeting a ball, the driven member being snapped forward an angular amount equal to one or more teeth. This does not have any detrimental effect in most cases, but when used in such devices as the accumulator mechanism of calculating machinery, this feature often causes errors due to the addition of extra digits.

The principal object of the invention is to overcome the above difficulties, and to provide the driven member of a clutch mechanism with a locking means for preventing overriding.

Another object is to permit the engagement of the component part of a clutch mechanism at high speeds without any overriding.

A further object is to insure that the clutch members will be locked in fixed relation during the period of their engagement.

A still further object is to form a non-overriding clutch mechanism which is effective in operation, and simple to manufacture.

Other objects and structural details of the invention will be apparent from the following specification when read in conjunction with the accompanying drawing, wherein Fig. 1 is a side elevation of the clutch members incorporated in the accumulator drive mechanism of an accounting machine;

Figure 5:
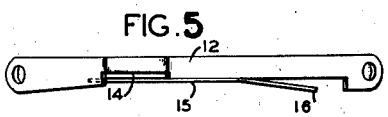
Fig. 5 is a plan view of the locking member.
Figure 6:
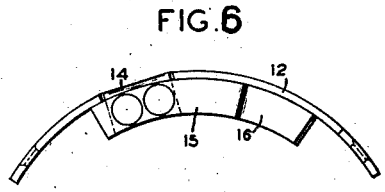
Fig. 6 is a side elevation of Fig. 5.

The clutch comprises a driving member 10 and a driven member 11, the driving member being fastened to a drive shaft in any well known manner. Secured to the periphery of the driven member 11 is an arcuate metal strip 12 (Figs. 5 and 6) having a lug 14 bent at right angles thereto. Secured to the lug 14 in any well known manner, such as riveting, is a flat spring member 15 having an offset portion 16.

Figure 7:
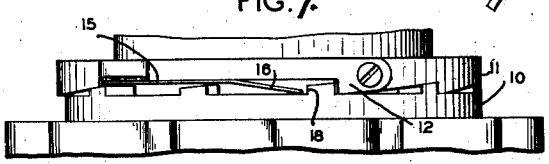
Fig. 7 is an enlarged detail of the driving and driven members of the clutch showing the locking member.

Both the driving and driven members are formed with ratchet teeth, the sloping faces of which coincide. Two teeth of the driven member 11 have been omitted to accommodate the spring 15, and the teeth of the driving member 10 have been cut away as shown in Fig. 7, to form a shoulder 18 against which the offset portion 16 of spring 15 abuts when the two members are engaged. The length of the spring 15 is such that when the teeth of both members are fully engaged, there is a very slight clearance between the shoulder 18 and the end of the spring.

It is obvious from the above description that when the driven member 11 is brought into engagement with the driving member 10, it will rotate until the teeth engage, at which time the spring 15 will snap down in back of the shoulder 18 and prevent the driven member from jumping ahead, due to the impact.

Figure 1:
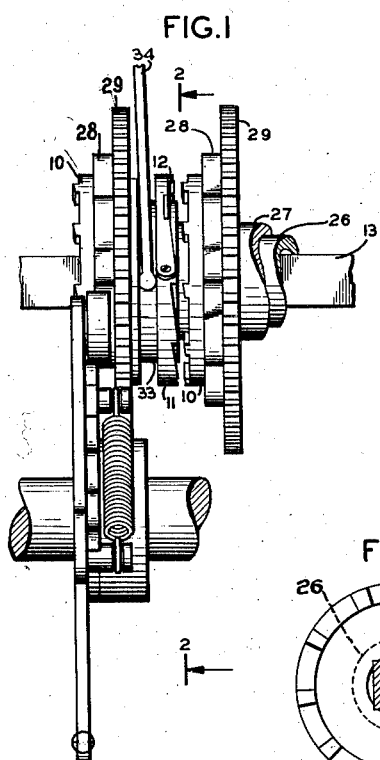
Figure 3:
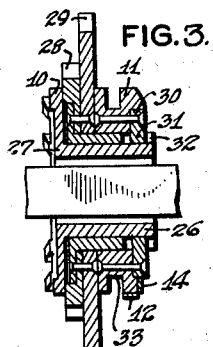
Fig. 3 is a cross section taken on line 3—3 of Fig. 2.
Figure 2:
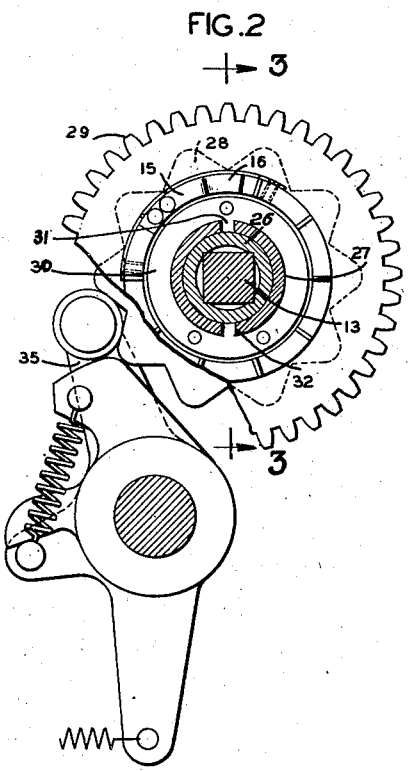
Fig. 2 is a cross section taken on line 2—2 of Fig. 1.

An embodiment of the invention is shown in Figs. 1, 2, and 3 as used in an accumulator drive mechanism similar to that disclosed and described in detail in my copending application Serial No. 76,492, filed April 25, 1936, for Calculating machines. In this machine the accumulator drive mechanism is electrically controlled by means of a magnet, the circuit of which passes through a commutator. It is obvious that a clutch operated in this manner must not be permitted to override, or the accumulation of the digits will be in error.

Figure 4:
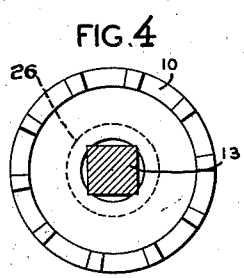
Fig. 4 is a front elevation of the driving member of the clutch.

The accumulator drive mechanism is shown mounted on a square drive shaft 13. As shown in Figs. 3 and 4, the drive member 10 of the clutch has a squared hub portion 26 adapted to cooperate with shaft 13, thereby locking it for rotation therewith. Rotatably mounted on the hub 26 is a sleeve 27, to which is secured a detent wheel 28 and drive gear 29. Secured to the face of member 11 is a ring 30 (Fig. 2) having lugs 31 formed thereon. The driven member 11 is slidably mounted on the sleeve 27, and is connected for rotation therewith by the lugs 31, which extend into longitudinal slots 32 cut in the sleeve 27 so that any rotation of member 11 will be transmitted to wheel 28 and gear 29. It will be noted in Fig. 1, that the member 11 is rotatably mounted on the sleeve 27 to which is secured the left-hand gear 29, also that the right-hand gear 29 is in no way connected to the right-hand driving member 10 except that it is secured to its associated sleeve 27 which is rotatably mounted on the hub 26 of the member 10. The driven member 11 is formed with a circumferential groove 33, in which is positioned a forked operating member 34. The detent wheel 28 has a spring pressed roller arm 35 associated therewith, to insure that the accumulator drive gear is held stationary when the clutch is disengaged. This arm 35 is withdrawn from contact with the detent wheel just prior to the engagement of the clutch members, and released for engagement immediately after the clutch members are disengaged.

When the fork member 34 is operated by an electromagnet or any other well known means (not shown), the driven member 11 is moved longitudinally on sleeve 27 until it engages the constantly rotating right-hand drive member 10 (Fig. 1) thereby rotating the left-hand gear 29 and detent wheel 28.

While the above embodiment discloses one use for the invention, it is to be understood that many changes may be made without departing from the spirit of the invention.

What I claim as new, and desire to secure by Letters Patent, is:

1. In a clutch mechanism, a drive member, a driven member, complemental teeth on said members to insure positive uni-directional drive of one member by the other member, the teeth on the drive member formed with a shoulder thereon and a spring secured to said driven member adapted to resiliently cooperate with any one of said shoulders on said drive member thereby preventing relative angular displacement in a direction opposite to said drive.

2. In a clutch mechanism, a drive member, a driven member, said members having complemental teeth cut in the faces thereof to insure a uni-directional drive of both members, each tooth on said drive member being cut away to form a shoulder, and a locking member comprising a spring secured at one end to said driven member, the free end of said spring being adapted to cooperate with said shoulder on any one of said teeth in said driving member thereby preventing relative angular displacement in a direction opposite to said drive.

3. In a clutch mechanism, a drive member, a driven member, said members having complemental teeth formed on the faces thereof for effecting positive drive of the driven member in one direction only, a portion of the teeth on said drive member being cut away to form a shoulder, and a locking device comprising an arcuate spring metal strip secured to the periphery of said driven member, said strip having a portion bent to lie in the path of and adapted to cooperate with one of said shoulders thereby preventing angular displacement of said members in a direction opposite to said drive.

HAROLD P. MIXER.